Jan. 29, 1957   W. J. MEREWETHER   2,779,406
SCREEN FOR AUTOMOBILE WINDOWS
Filed July 3, 1953   3 Sheets-Sheet 1
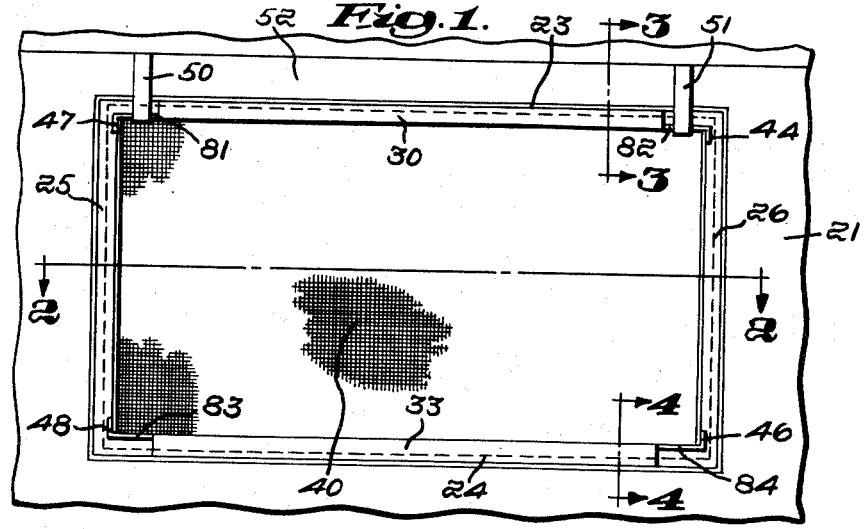
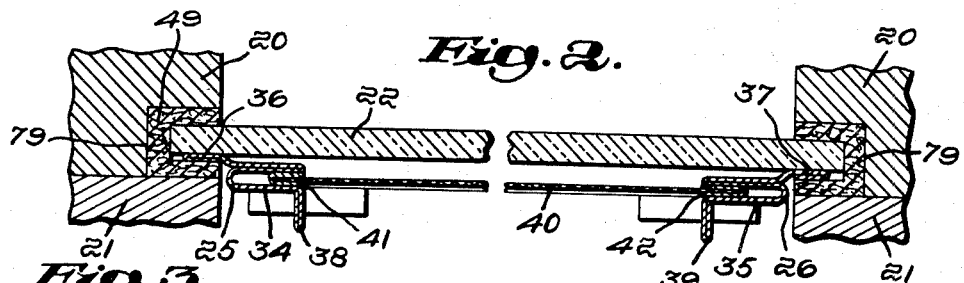
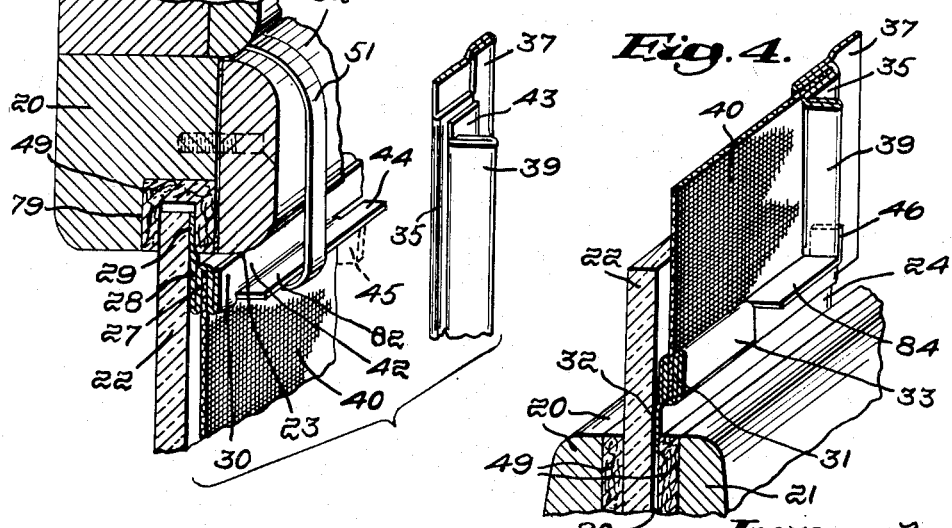
Inventor:
Walter J. Merewether,
by Thomson & Thomson
Attorneys

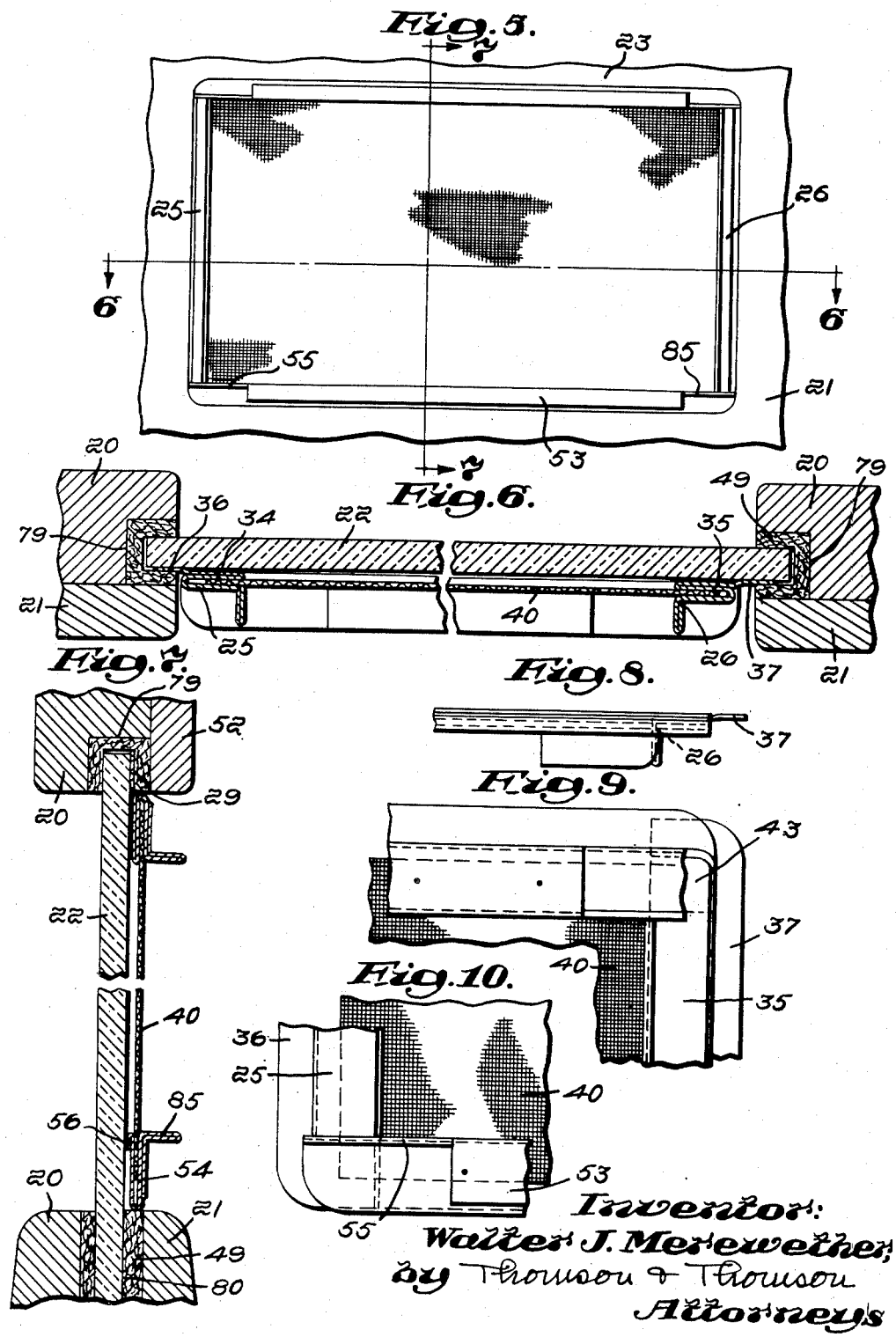

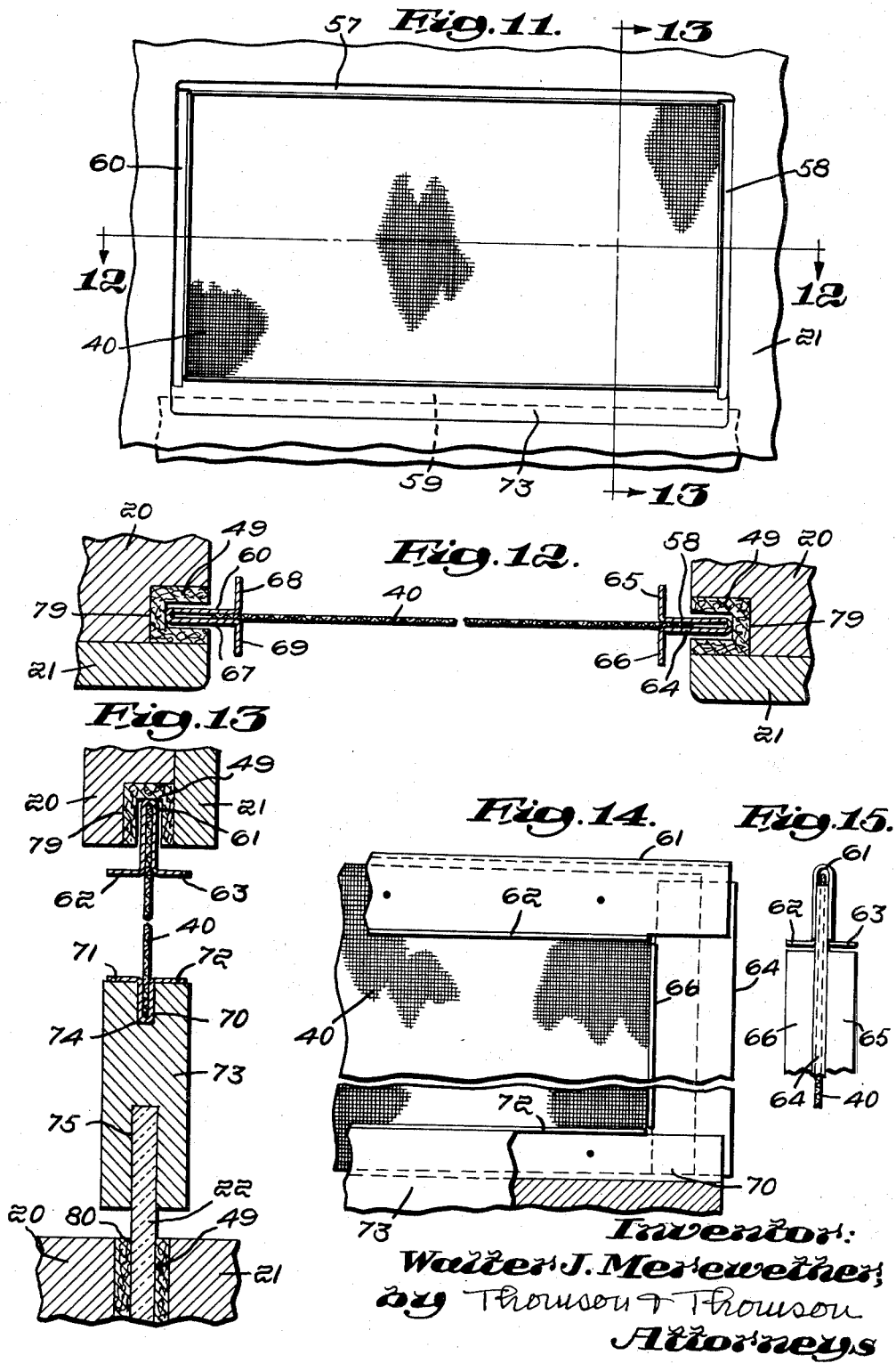

United States Patent Office 2,779,406
Patented Jan. 29, 1957

2,779,406

SCREEN FOR AUTOMOBILE WINDOWS

Walter J. Merewether, Winchester, Mass.

Application July 3, 1953, Serial No. 365,893

6 Claims. (Cl. 160—373)

This invention relates to window screens and more particularly to screens adapted for mounting in the windows of automobiles.

Most of the automobiles at present on the market are not provided with screens on the windows. The advantage of screening the windows against insects can be readily appreciated, from the point of view not only of comfort, but of safety, as many accidents have occurred as the result of bees or wasps stinging the driver and causing him to lose control of the vehicle. Screens would add greatly to the passengers' comfort, not only in driving but especially when the vehicle is parked at an outdoor theatre or beach where insects are prevalent. The mounting of a screen in an automobile, however, presents unique problems. The screen must be readily removable and at the same time secured against accidental displacement by vibration and wind. Although sufficient structural stiffness is required to hold the screen in shape, intermediate cross bars and wide frames which interfere with the driver's view are undesirable.

The object of this invention is to provide a type of screen which as well as meeting the foregoing requirements, may be installed without the use of tools and without defacing the window frame, which is readily adjustable to allow for variations in window sizes, which is neat and inconspicuous in appearance, which may be stored in a minimum of space when not in use, and which does not interfere with the normal operation of the automobile window.

In the drawings illustrating the invention:

Fig. 1 is a side view of a screen constructed according to the invention,

Fig. 2 is an enlarged cross-section, partly broken away, along line 2—2 of Fig. 1, Fig. 3 is an exploded detail view of the corner parts taken in cross-section along line 3—3 of Fig. 1, Fig. 4 is an enlarged detail of a lower corner of the screen, shown in isometric, Fig. 5 is a side view of a modification of the screen, Fig. 6 is an enlarged cross-section partly broken away taken along line 6—6 of Fig. 5, Fig. 7 is an enlarged cross-section, partly broken away, along line 7—7 of Fig. 5, Fig. 8 is a detail view of the top of one corner of the screen of Fig. 5, Fig. 9 is a side view of the corner detail of Fig. 8, Fig. 10 is a detail side view of one of the lower corners of the screen of Fig. 5, Fig. 11 is a side view of another modification of the screen, Fig. 12 is an enlarged cross-section, partly broken away, taken along line 12—12 of Fig. 11, Fig. 13 is an enlarged cross-section, partly broken away taken along line 13—13 of Fig. 11, Fig. 14 is an enlarged side detail of the top and bottom corners of the screen of Fig. 11, and Fig. 15 is an end detail of one of the top corners of the screen of Fig. 11.

The numerals 20 and 21 indicate throughout the inner and outer frames around the window in the door of an automobile, 22 the sliding pane enclosed in the frame, 79 the groove guiding and enclosing the margins of the pane, 49 the felt padding with which the groove is customarily lined, and 80 the window well.

The frame of the screen shown in Fig. 1 consists of a top member 23, a bottom member 24 and side members 25 and 26. The frame members are preferably formed of sheet metal and all have in part, the same general shape in cross-section. For example, as shown in Fig. 3, top member 23 consists of an inverted U-shaped channel, an upwardly extending flange 28 having an offset lip 29, and an upwardly extending lapped portion 30, which is slit and bent outward near the ends to form guide ribs 81 and 82. Bottom member 24, Fig. 4 consists of a U-shaped channel 31, a downwardly extending offset lip 32, and a downwardly extending lapped portion 33, which is slit and bent outward near the ends to form guide ribs 83 and 84. Side bars 25 and 26 (Fig. 2) consist respectively of U-shaped channels 34 and 35, sidewardly extending offset lips 36 and 37, and outwardly projecting flanges 38 and 39. A piece of wire screening 40 is mounted in the frame and has its top and bottom edges secured, for example, by spot welding, in channels 27 and 31 respectively. The side edges of the screening are secured in binding strips 41 and 42 which are slidably received in channels 34 and 35 respectively.

Fig. 3 illustrates the connection of frame members 23 and 26 at the upper right hand corner of the frame. Flange 39 is cut off shorter at the top than lip 37 and channel 35, and the portion of channel 35 extending above flange 39 is slit along its outer fold, leaving a tab 43. This tab slides into the right hand end of channel 27, the upper end of lip 37 and the rear wall of the slit end of channel 35 passing behind frame member 23. The right hand end of guide rib 82 is cut away from channel 27, leaving a tab 44. When the frame members 23 and 26 are assembled together, tab 44 is bent down over the end of flange 39, to the position indicated by the dotted line 45 in Fig. 3, thus securing the upper end of member 26. The lower end of member 26 is constructed in the same manner as the upper end and is secured to member 24 by a tab 46 (Fig. 4) bent up from the right hand end of guide rib 84. Frame member 26 is adjustable sidewise between the limits defined by binding strip 42 and tabs 44 and 46. Ribs 82 and 84 guide flange 39 and prevent vertical displacement of member 26 as it slides back and forth. Frame member 25 is constructed in the same manner as member 26 and is secured to members 23 and 24 by tabs 47 and 48 bent from guide ribs 81 and 83 respectively.

When the screen is in place in the car window, the offset lips 29, 32, 36 and 37 lie between the outside face of the window pane 22 and the felt padding 49, with which the window well 80 and the side and top parts of groove 79 are lined. The offset lips of the flanges serve to space the screen and frame away from the pane so that it may move up and down with a minimum of friction. To install the screen, side members 25 and 26 are slid toward each other by pressing on flanges 38 and 39 until flanges 36 and 37 are in position to clear the window opening. Lip 32 is then pushed down into the window well between pane 22 and padding 49 until lip 29 may be inserted under the top edge of the window frame and pushed up into the top part of groove 79. Members 25 and 26 are then slid out to secure lips 36 and 37, in the side parts of the window frame groove, and the screen is raised to push lip 29 into the top part of the groove. The screen is secured in this position by spring clips 50 and 51 applied over ribs 81 and 82, and the usual trim strip 52 along the top of the car door.

In the modification illustrated in Figs. 5 to 10, the top frame member 23, and side frame members 25 and 26 are the same as in Figs. 1 to 4, except that the retaining tabs 44 and 47 are omitted. The bottom frame member may also be similar to member 24 without the retaining tabs. As an alternative, a bottom member 53, having a channel 54, outwardly extending ribs 55 and 85, and a bent over inner lip 56, may be used. This member rests on top of the felt padding instead of extending into the window well, and lip 56 serves to maintain the spacing between the screen and the window pane. The screening 40 is spot welded or otherwise attached in the top and bottom frame members. The side edges of the screening are formed as a selvage, or may be bound with flexible material such as cloth.

This modification of the screen is installed in the window by sliding members 25 and 26 toward each other and pushing flange 29 into the top groove of the window frame until member 53 rests on the padding of the window well. Members 25 and 26 are then slid out to push lips 36 and Members 25 and 26 are then slid out to push clips 36 and 37 into the side grooves of the window frame. The spring clips may be omitted as channel 54 will hold the screen up. In this version, the side members 25 and 26 may be removed when the screen is taken out of the window, so that the screen may be rolled up for storage.

Both of the modifications described above are designed to remain in place more or less permanently and do not interfere with the normal operation of the window. The modification illustrated in Figs. 11 to 15, is intended to be inserted only when the window is open, and removed when it is closed. The screen frame consists of members 57, 58, 59, and 60, all of the same general shape in cross-sections. The top member, for example consists of a U-shaped channel 61 with outstanding legs 62 and 63. Side members 58 and 60 consist of channels 64 and 66, and legs 65, 66, 68 and 69 respectively. The bottom member is formed as a somewhat shallower channel 70 with outstanding legs 71 and 72. The screening 40 is spot welded or otherwise secured at top and bottom in channels 61 and 70, and the side edges of the screening are slidably received in channels 64 and 67. The edges may be flexible, as in the modification of Figs. 5–10, or may have a stiff binding, as in the modification of Figs. 1–4. The legs of all four frame members are cut off near the ends, and the top and bottom ends of the side channels are slidably received in the ends of the top and bottom channels.

To install the screen, the side members are slid toward each other to clear the window opening and channel 61 is pushed into the top groove of the window frame. The side members are then slid out until channels 64 and 67 enter the side grooves of the window frame. The screen is supported on a separate bar 73 having a groove 74 on its upper edge in which channel 70 is received. Bar 73 has a groove 75 in its lower edge which accommodates the window pane 22. When the screen is in place the window pane is moved up to lock the assembly in position.

In any of these modifications, the corners of the screen members may be suitably rounded, as indicated in Fig. 9, to conform to the shape of the window opening on any particular make of car. The adjustability of the side members allows for a certain amount of variation in the width and height of the window opening and insures a tight fit. No central joints or supports are employed, and the frame is so inconspicuous that the screen affords virtually the same freedom of vision as an unscreened window. The frame may be chrome plated or decorated as desired to harmonize with the trim of the automobile so as to present an attractive appearance. All modifications of the screen are secured in place without the use of special tools and without marring the automobile body.

What is claimed is:

1. A screen adapted for mounting in an automobile window of the sliding pane type having a retaining groove for the pane all around the window opening, comprising: a top frame member having a projection adapted to enter said groove at the top of the opening; a generally rectangular sheet of screening material somewhat narrower than the opening, having its top margin secured to said top member; a bottom frame member adapted to lie along the bottom of the opening, the bottom margin of said sheet being secured to said bottom member; a pair of side frame members slidably engaging the side margins of said sheet and the ends of said top and bottom members, said side members being freely slidable toward each other to a position limited by said side margins and away from each other; edge projections on said side members adapted to clear said opening when the members are in said position and to enter said groove at the side of the opening when the members are spread apart; and flanges on said side members projecting perpendicularly to said sheet and constituting finger grips for moving said side members toward and away from each other.

2. A screen as described in claim 1, said bottom member having a downward projection adapted to enter said groove at the bottom of the opening, the projection on said top member being shorter than the depth of the groove by an amount sufficient to permit raising of the screen to disengage the projection on said bottom member from said groove.

3. A screen as described in claim 1, having a bar adapted to receive said bottom member, and said bar having a groove on its underside adapted to receive the window pane for securing the screen in the window opening, and a groove on its upper side for receiving said bottom member.

4. A screen as described in claim 1, said sheet having rigid binding strips disposed along its side margins and slidably received in said side frame members.

5. A screen as described in claim 1, said side frame members having offset portions adapted to engage the window pane and space the screen from the same when the screen is mounted in the automobile window opening.

6. A screen as described in claim 1, said sheet having flexible side margins, and said side frame members being removable to permit the screen to be rolled for storage.

References Cited in the file of this patent

UNITED STATES PATENTS

| | | |
|---|---|---|
| 875,826 | Knowles | Jan. 7, 1908 |
| 1,206,497 | Banks | Nov. 28, 1916 |
| 1,600,809 | Durdin | Sept. 21, 1926 |
| 1,712,341 | Fisher | May 7, 1929 |
| 1,753,866 | McCormack | Apr. 8, 1930 |
| 1,942,225 | Tibbetts | Jan. 2, 1934 |
| 2,109,160 | Yurkovich | Feb. 22, 1938 |